(12) United States Patent
Chitren

(10) Patent No.: US 7,461,846 B2
(45) Date of Patent: Dec. 9, 2008

(54) BEARING ISOLATOR WITH POROUS SEAL

(75) Inventor: Elizabeth Chitren, Fairport, NY (US)

(73) Assignee: Garlock Sealing Technologies LLC, Palmyra, NY (US)

(*) Notice: Subject to any disclaimer, the term of this patent is extended or adjusted under 35 U.S.C. 154(b) by 114 days.

(21) Appl. No.: 11/511,787

(22) Filed: Aug. 29, 2006

(65) Prior Publication Data

US 2007/0013142 A1 Jan. 18, 2007

Related U.S. Application Data

(60) Continuation-in-part of application No. 11/297,489, filed on Dec. 9, 2005, now Pat. No. 7,201,377, said application No. 11/297,489 is a division of application No. 10/674,264, filed on Sep. 29, 2003, now abandoned.

(60) Provisional application No. 60/712,329, filed on Aug. 30, 2005, provisional application No. 60/414,862, filed on Sep. 30, 2002.

(51) Int. Cl.
*F16J 15/44* (2006.01)
*F16J 15/447* (2006.01)

(52) U.S. Cl. .................... 277/347; 277/411

(58) Field of Classification Search ............ 277/347, 277/349, 411, 412, 418, 419, 420
See application file for complete search history.

(56) References Cited

U.S. PATENT DOCUMENTS

| | | | | | |
|---|---|---|---|---|---|
| 2,554,488 | A | * | 5/1951 | Carr | 277/365 |
| 4,277,072 | A | * | 7/1981 | Forch | 277/404 |
| 4,817,966 | A | | 4/1989 | Borowski | |
| 4,852,890 | A | | 8/1989 | Borowski | |
| 5,024,451 | A | | 6/1991 | Borowski | |
| 5,028,054 | A | * | 7/1991 | Peach | 277/348 |
| 5,480,161 | A | * | 1/1996 | Borowski | 277/419 |
| 6,390,477 | B1 | | 5/2002 | Drago et al. | |
| 6,471,215 | B1 | | 10/2002 | Drago et al. | |
| 6,485,022 | B1 | | 11/2002 | Fedorovich | |
| 2006/0087084 | A1 | | 4/2006 | Chitren et al. | |

* cited by examiner

*Primary Examiner*—Vishal Patel
(74) *Attorney, Agent, or Firm*—Holland & Hart LLP (57) ABSTRACT

A bearing isolator assembly for sealing a rotating shaft with a porous sealing element including a rotor configured to sealingly engage with a shaft, and a stator configured to sealingly engage with a housing of an assembly. The rotor and stator are configured to engage with each other to define a labyrinthine pathway and one or more cavities, in which may be disposed a unitizing element and a porous sealing element. The porous sealing element provides a barrier to particulate contaminants from entering the interior of the housing, and to prevent egress of lubricants from the interior of the housing. The unitizing element limits axial and/or radial movement of the rotor with respect to the stator, and helps prevent wear of the rotor and/or stator by helping prevent the rotor from contacting the stator during operation.

14 Claims, 7 Drawing Sheets

DETAIL B

BEARING ISOLATOR WITH POROUS SEAL

CROSS-REFERENCES TO RELATED APPLICATION

This application claims priority to U.S. Provisional Application No. 60/712,329, entitled "Bearing Isolator with Porous Seal," filed Aug. 30, 2005, and is a continuation-in-part of U.S. patent application Ser. No. 11/297,489 entitled "Unitizing Element and Method for Assembling a Seal," filed Dec. 9, 2005 now U.S. Pat. No. 7,201,377, which is a divisional of U.S. application Ser. No. 10/674,264, entitled "Unitizing Element and Method for Assembling a Seal," filed Sep. 29, 2003 now abandoned, which claims priority to U.S. Provisional Application No. 60/414,862, filed Sep. 30, 2002, all of which are hereby incorporated by reference.

FIELD OF THE INVENTION

The present invention relates to rotary shaft seals. More particularly, the invention relates to labyrinth seals.

BACKGROUND

Labyrinth-type rotary shaft seals typically include two concentric ring structures which comprise a rotor and a stator. The rotor is sealingly engaged with a rotating shaft and the stator is sealingly engaged with a bearing housing. Many different types of seals have been used to try to seal the space between the spinning rotor and the fixed stator. These include O-rings, rubber lip seals, and labyrinth paths. Labyrinth type seals tend to be the most effective type of seal. Specifically contoured pathways or grooves are formed on the interior surfaces of the seal rings to create a labyrinth extending between the exterior of the bearing housing and the interior of the bearing housing. The labyrinth pathway serves as a hydrodynamic barrier to maintain fluid lubricants within the bearing housing and prevent contaminants from entering the bearing housing. The more elaborate the pathway, the less chance there is that contaminating materials will pass through the structure and into the bearing housing.

In addition, in a typical rotor and stator configuration, some minimum clearance must be maintained to keep the rotor and stator from contacting one another. In some applications, such as aircraft landing gear, the rotor may spin at speeds in excess of about 5000 rpm. If a surface of the rotor contacts a surface of the stator at these speeds, frictional heat develops, the components wear, and the overall efficiency and working life of the apparatus declines. It is, therefore, important to keep the rotor and stator separate.

Further, seals are used to prevent the migration of contaminants from the exterior of the bearing housing and rotor to the interior, as well as prevent loss of lubricating fluid from the interior of the bearing housing and rotor. Contaminants which migrate into the system need to be expelled quickly. Build up of particulate matter within the seal or housing can damage the seal and/or cause increased wear of the rotor and stator. Furthermore, any lubricating fluid forced out of the system must likewise be recaptured and returned to the interior of the rotor. Loss of lubricating fluid will lead to damaged parts and increase the frictional heat of the system Contaminants which do migrate into the system need to be expelled as quickly as possible. Build up of particulate matter can damage the seal and/or cause increased wear of the rotor and stator. Furthermore, any lubricating fluid forced out of the system must likewise be recaptured and returned to the interior of the rotor. Loss of lubricating fluid will increase the frictional heat of the system and will lead to damaged parts.

It would, therefore, be desirable to provide a labyrinth sealing device with improved particulate exclusion characteristics which would be particularly useful in dusty environments, such as coal pulverizers and cement grinders, as well as an improved capability to reduce the chance or duration of contact between the rotor and stator.

It is to these perceived needs that the present invention is directed.

SUMMARY

An embodiment of the present invention provides a seal comprising a rotor configured to sealingly engage with a shaft, and a stator configured to sealingly engage with a housing. The stator and rotor are configured to engage with each other to define a labyrinthine pathway. A unitizing element and a porous sealing element may be disposed within the labyrinthine pathway to provide contaminant exclusion characteristics and reduce the chance of the rotor and stator contacting each other.

As will be realized by those of skill in the art, many different embodiments of a seal with a unitizing element and a porous sealing element are possible. Additional uses, objects, advantages, and novel features of the invention are set forth in the detailed description that follows and will become more apparent to those skilled in the art upon examination of the following or by practice of the invention.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

An embodiment of the present invention comprises a rotor, a stator, a unitizing element, and a porous sealing element for use between a rotating shaft and a bearing housing. The rotor is configured to engage and rotate with a shaft located within a housing, while the stator is configured to engage with and remain stationary with respect to the housing. The rotor and stator are also configured to engage each other, but not to contact each other, though contact may occur. When engaged, the rotor and stator define a labyrinthine pathway extending from the exterior of the housing to the interior of the housing, as well as a first and second cavity. The labyrinthine pathway may help prevent the migration of lubricants from the interior of the housing, and/or may help prevent the migration of contaminants into the interior of the housing. The first cavity is configured to receive a unitizing element, and the second cavity is configured to receive a porous sealing element.

In an embodiment, the unitizing element is an annular ring shaped to fit one or more of the cavities defined by the rotor and stator. The unitizing element unitizes the rotor and stator, and may prevent separation and may restrict movement. This unitizing element may also contain a rear member which, in the case of axial movement, may provide a non-metallic component to prevent contact of the rotor and stator. In addition, a porous sealing element may be disposed within at least one of the annular cavities. The porous sealing element may increase the airborne particulate exclusion capability of the seal formed by the rotor and stator by providing a physical barrier for particulate matter.

An illustrative embodiment of the present invention comprises a rotor that is configured to engage and rotate with the shaft, while a stator is configured to engage with and remain stationary with respect to the housing. The rotor and stator engage and define a labyrinthine pathway which may connect the exterior of the housing to the interior of the housing. While engaged, the rotor and stator may be configured to remain out of contact with each other to prevent wear of their respective components. The labyrinthine pathway may be configured to help prevent the migration of contaminants into the interior of the housing, as well as help prevent the migration of lubricating material to the exterior of the housing. As contaminants attempt to pass along the labyrinthine pathway towards the interior of the housing, the shape of the pathway may aid in impeding the contaminants' movement. In addition, contaminants may encounter the porous sealing element. The porous sealing element may be configured to prevent the contaminants from passing through the porous sealing element. For example, if the pores within the porous sealing element have a pore diameter smaller than the diameter of a contaminant particle, that particle may be prevented from passing through the porous sealing element. Further, as lubricating fluid travels within the pathway, it may be guided back towards the interior of the housing by the shape of the labyrinthine pathway. In addition, the lubricating fluid may be prevented from escaping the housing by the porous sealing element.

The invention will now be further described by way of specific embodiments thereof, with the understanding that the present disclosure is to be considered as an exemplification of the principles of the invention. Exemplary embodiments of the present invention are shown in the figures where like numerals refer to like aspects of the various embodiments.

Referring now to FIGS. 1-4, a bearing isolator according to one embodiment of the present invention comprises a stator 10, a rotor 50, a unitizing element 30 and a porous sealing element 40. The rotor 50 and the stator 10 engage to form labyrinthine pathway 20, as well as first cavity 90 and second cavity 80. Unitizing element 30 and porous sealing element 40 are disposed within the cavities 80, 90. In an embodiment of the present invention, the rotor 50 and stator 10 may only define one cavity, wherein both the unitizing element 30 and the porous sealing element 40 may be disposed. As the rotor 50 turns, the unitizing element 30 may prevent the rotor 50 from contacting the stator 10 by providing a low friction buffer between the two components, and further may retain lubrication within and exclude contaminants from the bearing housing. Further, the porous sealing element 40 may provide a barrier to prevent contaminants from entering the housing, and may prevent lubrication from exiting the bearing housing.

A porous sealing element 40, according to an embodiment of the present invention, may comprise a microcellular material. For example, in one embodiment of the present invention, the microcellular material may comprise a silicone foam. In an embodiment of the present invention, the porous sealing element 40 may comprise one or more resins, such as polyurethane, polysulfone, or polyethylene. In an embodiment of the present invention, the porous sealing element 40 may comprise a fibrous material.

Some embodiments of the present invention may comprise porous sealing element 40, wherein the pores defined within the porous sealing element 40 may have a diameter of approximately 500 to 600 microns (approximately 0.020 to 0.023 inches). In some embodiments of the present invention, the porous sealing element 40 may have a diameter less than approximately 100 microns (approximately 0.004 inches). Some embodiments of the present invention may comprise pores with diameters greater than or equal to 100 microns.

In some embodiments of the present invention, a plurality of porous sealing elements may be used. In an embodiment of the present invention, each of the plurality of porous sealing elements may comprise pores of approximately the same diameter. In another embodiment of the present invention, each of the plurality of porous sealing elements may comprise pores having different diameters. For example, a seal according to the present invention may comprise two porous sealing elements, where the first porous sealing element has pores with diameters larger than the pores of the second porous sealing element. In still another embodiment of the present invention comprising a plurality of porous sealing elements, some of the plurality of porous sealing element may comprise pores having approximately the same diameters, while some of the porous sealing elements may comprise pores having different diameters.

In an embodiment of the present invention, the unitizing element 30 may be configured to limit the radial and/or axial movement of the rotor 50 with respect to the stator 10. For example, while the shaft and rotor 50 are in motion, there may be loads placed upon the shaft and/or housing causing the shaft and rotor 50 to move axially with respect to the housing and stator 10 (i.e. move along the axis of rotation). This movement may cause the rotor 50 to move towards the stator 10. The unitizing element 30 may provide resistance to that axial movement and may help prevent the rotor 50 from contacting the stator 10, thereby potentially damaging the rotor 50 and/or the stator 10. Further, if a load is put on the shaft which causes it to move radially with respect to the shaft (i.e. move perpendicularly to the axis of rotation), the unitizing element 30 may provide resistance to that radial movement, and may help prevent the rotor 50 from contacting the stator 10, again potentially preventing damage to the rotor 50 and/or the stator 10. In an embodiment of the present invention, the unitizing element 30 may comprise a void that allows a portion of the unitizing element to deflect and thereby absorb some force caused by axial and/or radial motion of the rotor with respect to the stator.

An embodiment of the present invention may comprise a plurality of unitizing elements. For example, it may be advantageous to incorporate multiple unitizing elements into a bearing seal according to an embodiment of the present invention for use in an environment where significant axial or radial loads are expected on the rotor and/or stator. The use of multiple unitizing elements may spread help extend the functional life of the bearing seal by spreading the force of contact of the rotor across multiple unitizing elements. The use of multiple unitizing elements may also provide increased contaminant exclusion or lubricant retention characteristics.

In an embodiment of the present invention, the unitizing element 30 of the present invention comprises a material suitable for its intended purpose. The selection of such a material may be made based on one or more factors including, but not limited to, anticipated operating temperature ranges, operating pressure ranges, coefficient of friction of the material, or other operating conditions (such as the likelihood of significant axial or radial movement of the rotor, as in aircraft landing gear, or a very dirty environment). Common materials for use in a unitizing element 30 that may be used in some embodiments of the present invention comprise fluorinated polymers or resins. In one embodiment of the present invention, the unitizing element 30 comprises a lubricious plastic material. In another embodiment of the present invention, the unitizing element 30 comprises rubber, such as hydrogenated NBR. In another embodiment of the present invention, the unitizing element 30 comprises polytetrafluoroethylene (PTFE). In an embodiment of the present invention, the unitizing element 30 comprises filled PTFE. Filled PTFE comprises PTFE with a filler dispersed throughout. Fillers include, but are not limited to, structural fillers such as glass, and lubricants such as graphite, molybdenum disulphide, other carbon fillers, and other solid lubricants.

Figure 1:
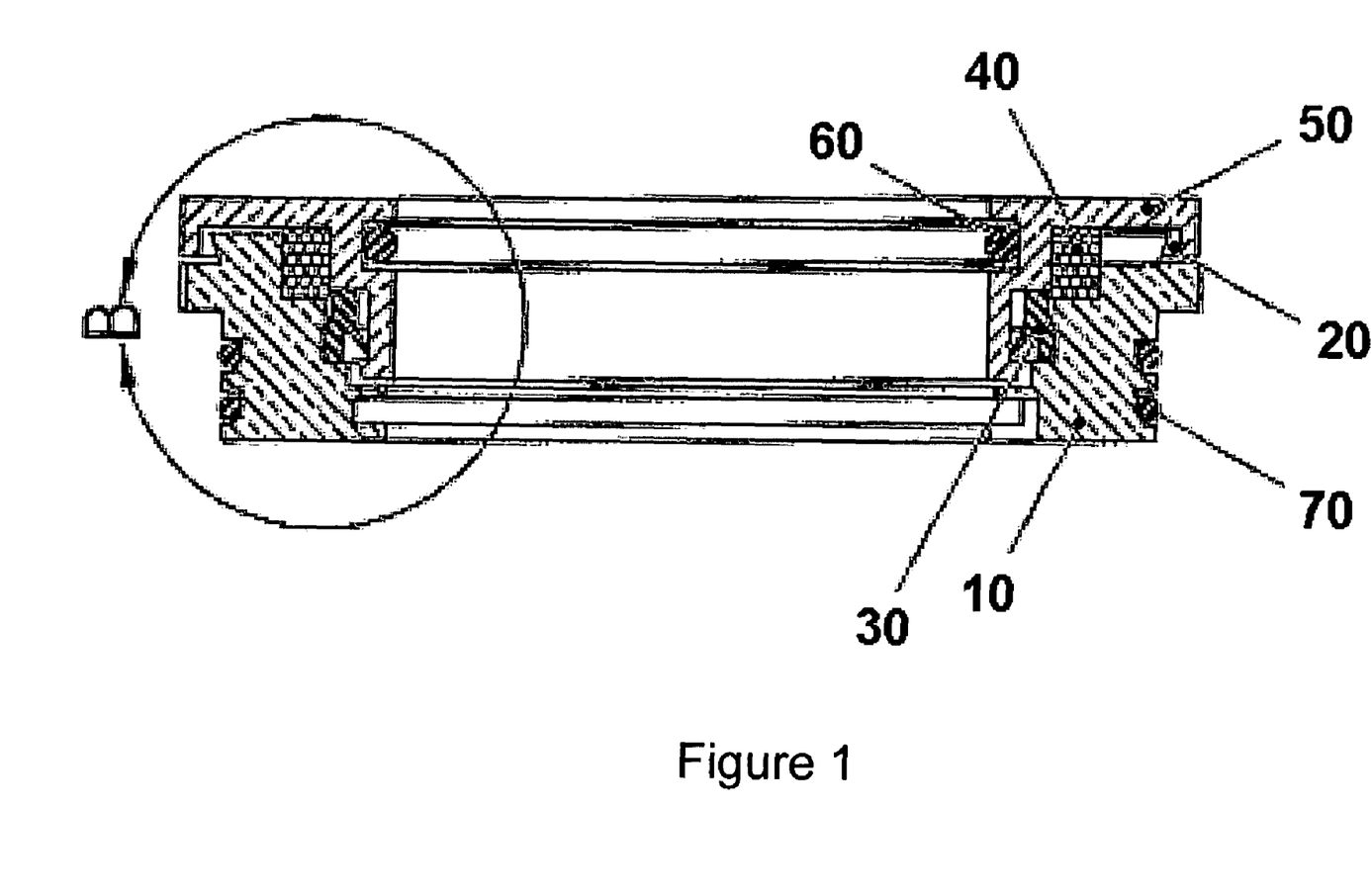
FIG. 1 shows a cross-section of a bearing isolator with porous sealing element according to one embodiment of the present invention.
Figure 2:
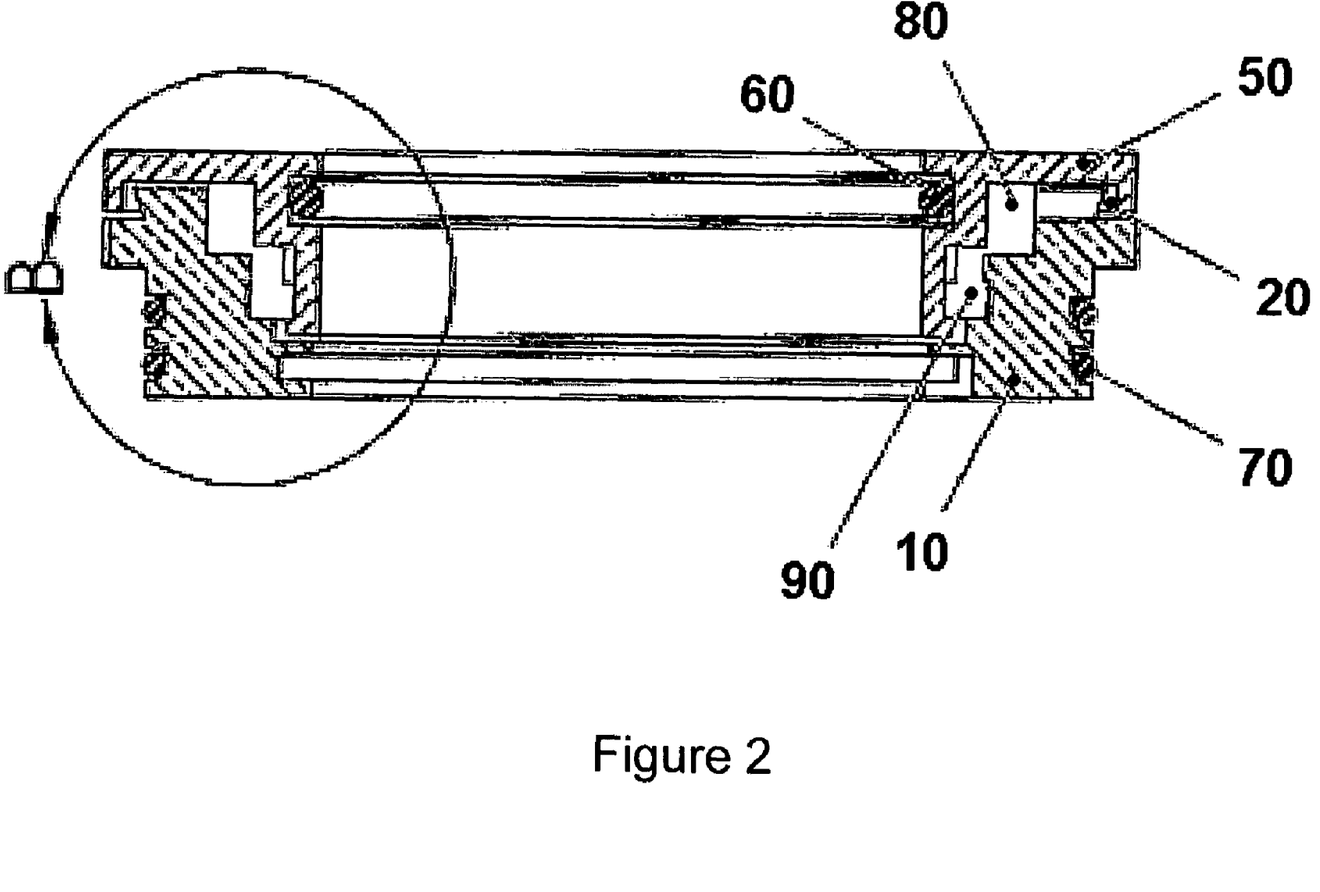
FIG. 2 shows a cross-section of a bearing isolator with cavities for receiving a porous sealing element and unitizing element according to one embodiment of the present invention.
Figure 3:
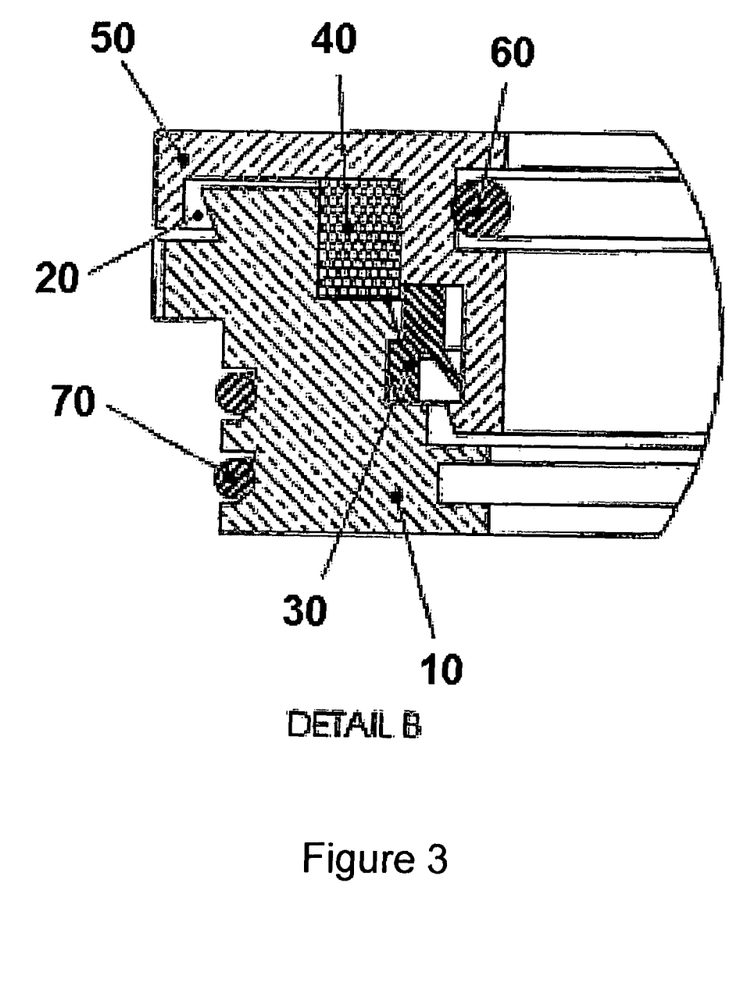
FIG. 3 shows a partial cross-section of a bearing isolator with porous sealing element according to one embodiment of the present invention.
Figure 4:
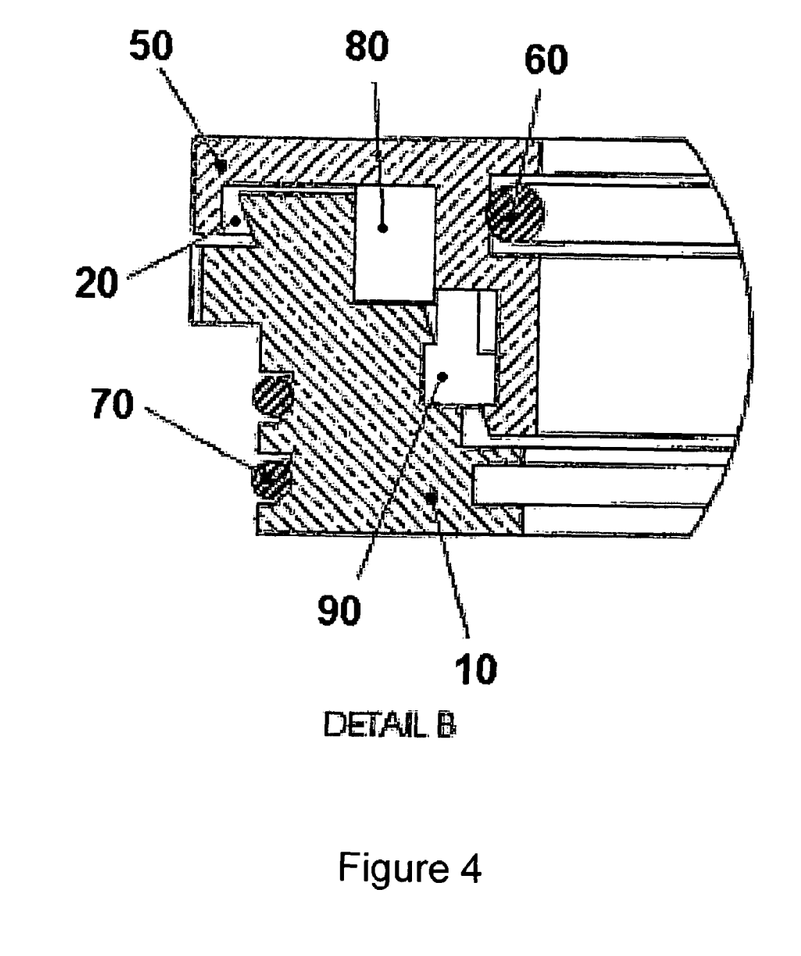
FIG. 4 shows a partial cross-section of a bearing isolator with cavities for receiving a porous sealing element and unitizing element according to one embodiment of the present invention.
Figure 5:
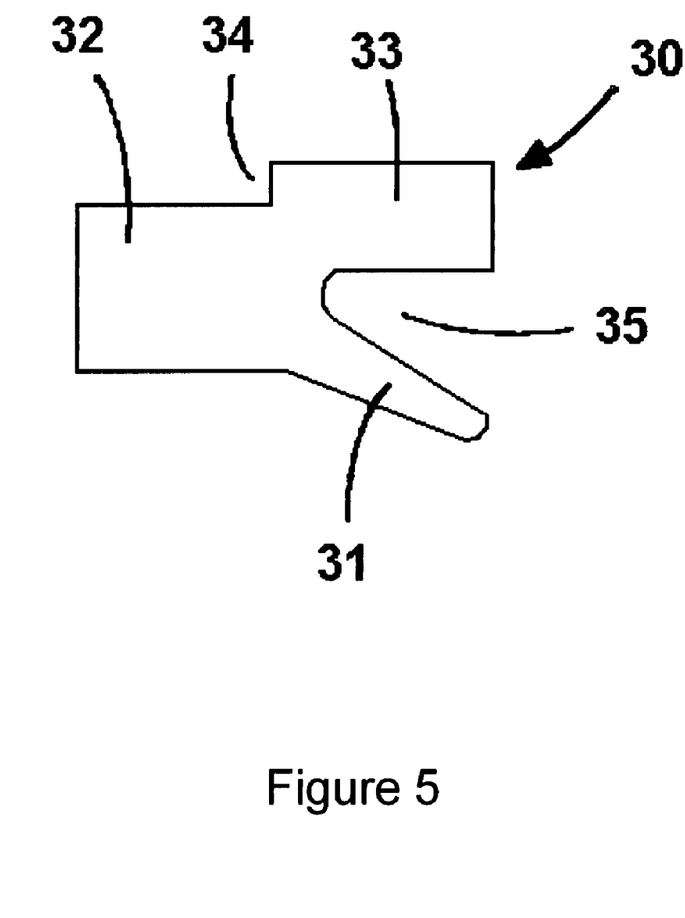
FIG. 5 shows a cross section of a unitizing element according to one embodiment of the present invention.

The unitizing element 30 may be viewed in more detail in FIG. 5, which shows a cross-sectional view of the unitizing element. Viewed in cross section, the unitizing element comprises a rotor engaging member 33, a rear member 32 and an stator engaging member 31.

In one embodiment of the present invention, the radially outer surface of the unitizing element comprises two areas of differing diameter. The differing diameters include, one diameter in the area of the rear member 32 and a differing diameter in the area of the rotor engaging member 33. A wall 34 is formed by the disparity in diameter between the rear member 32 and the rotor engaging member 33. This wall 34 may function to retain the unitizing element within a rotor 50 during assembly, and/or to unitize the rotor 50 and stator 10 after assembly. In a preferred embodiment of the present invention, the wall 34 is positioned at about the axial midpoint of the unitizing element. However, one skilled in the art will recognize the position of the wall 34 may vary. For example, in an embodiment of the present invention, the position of the wall 34 may depend on the functionality required of the unitizing element and/or the configuration of the rotor and stator assembly. In a preferred embodiment of the present invention, the wall 34 is substantially perpendicular to the axis of rotation.

The stator engaging member 31 extends from the radially inner side of the unitizing element 30. The stator engaging member 31 extends from about the midpoint of the unitizing element 30 at an angle. The length and location of the stator engaging member 31 may depend upon rotor 50 and/or stator 10 characteristics, and/or ease of assembly concerns. The stator engaging member 31 may have sufficient strength to unitize the sealing assembly, while being flexible enough to deflect during assembly. In an embodiment of the present invention, there may a void 35 formed by the area between the rotor engaging member 33 and the stator engaging member 31. This void 35 may provide an area for the stator engaging member 31 to deflect into when the rotor 50, stator 10, porous sealing element 40, and unitizing element 30 are brought together into a sealing assembly.

The dimensions of the wall 34, rear member 32, rotor engaging member 33 and stator engaging member 31 as well as that of the unitizing element 30 itself may vary according to the intended use of the unitizing element. These modifications in dimension will be apparent to one skilled in the art and fall within the scope of this invention. Thus, a unitizing element 30 according to an embodiment of the present invention is not limited to sealing applications of any particular size, and has a wide range of uses.

Figure 6:
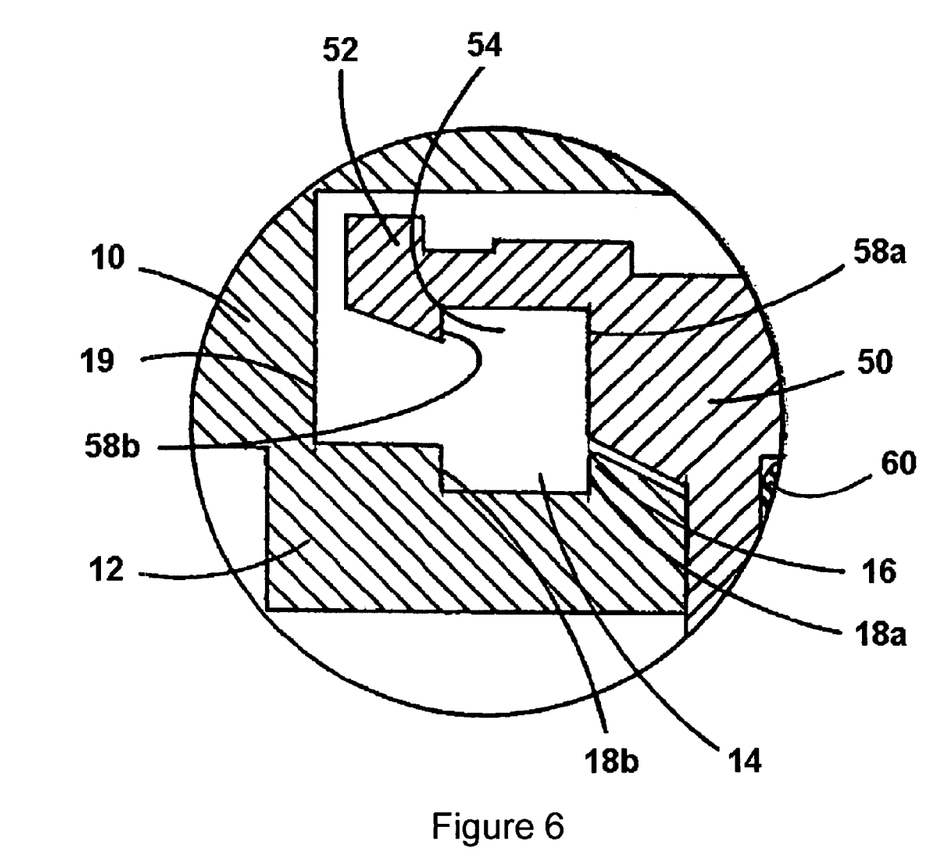
FIG. 6 shows a partial cross-sectional view of a bearing isolator with cavities for receiving a porous sealing element and unitizing element according to one embodiment of the present invention.
Figure 7:
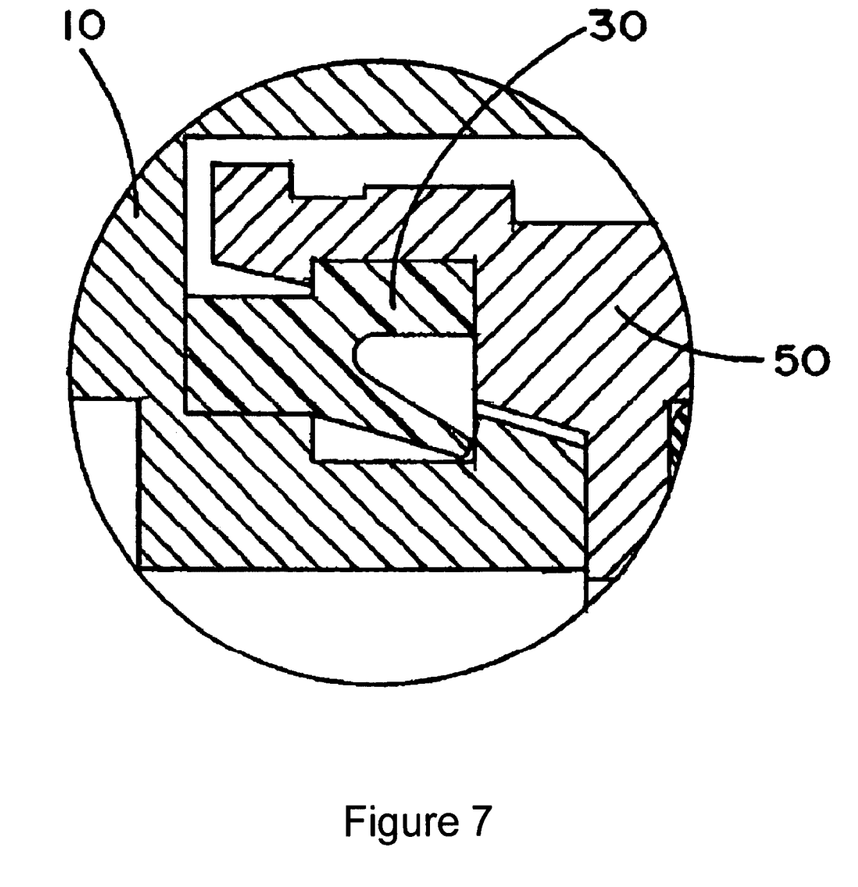
FIG. 7 shows a partial cross-section of a bearing isolator with porous sealing element according to one embodiment of the present invention

In an embodiment of the present invention, viewable in FIGS. 6 and 7, a sealing assembly is provided comprising a unitizing element 30 according to an embodiment of the present invention. The sealing assembly comprises a rotor 50, stator 10, porous sealing element 40, and unitizing element 30. The rotor 50 is sealingly engaged to a shaft running through the center of the sealing assembly. The rotor 50 comprises an axially extending annular flange 52 comprising a rotor groove 54 located on a radially inward side of the flange 52. The stator 10 is sealingly engaged to a bearing housing and comprises an axially extending annular flange 12 comprising a stator groove 14 located on a radially outward side of the flange 12. A unitizing element 30 comprising a rotor engaging member 33, an stator engaging member 31, and a rear member 32 resides within the area formed by the space between the rotor annular flange 52 and the stator annular flange 12. The unitizing element 30 may reside partially within each of the rotor groove 54 and stator grove 14 with the rear member 32 extending toward the stator rear wall 19.

FIG. 7 shows an embodiment of the present invention without the unitizing element 30 in place. In one embodiment of the present invention, the sealing assembly includes a rotor 50, which is sealingly engaged to the shaft by an O-ring 60. The rotor includes an annular flange 52, which contains a groove 54 located on a radially inward side thereof. The groove 54 comprises two opposing walls 58a and 58b. Similarly, the stator 10 comprises an annular flange 12 containing a groove 14. The stator groove 14 also comprises two opposing walls 18a and 18b. In a preferred embodiment of the present invention, the opposing walls of the rotor groove 58a, 58b and the opposing walls of the stator groove 18a, 18b are about perpendicular to the axis of the shaft.

In one embodiment of the present invention, each opposing wall of the rotor groove is axially aligned with the corresponding opposing wall of the stator groove, such that opposing wall 58a is axially aligned with opposing wall 18a and opposing wall 58b is axially aligned with opposing wall 18b. This configuration forms an area of rectangular cross section in which the rotor engaging member 33 and inner engagement member 31 of the unitizing element 30 are housed.

In an embodiment of the present invention, at least one of the walls of the stator groove 54 and corresponding wall of the rotor groove 14 are offset, such that one of the pairs of rotor groove wall 58a or 58b and corresponding stator groove wall 18a or 18b are not in axial alignment.

In a further embodiment of the present invention, the stator 10 further comprises an expulsion port located on the stator's atmospheric side. The expulsion port allows any contaminants that migrate into the seal area to be expelled from the assembly.

In an embodiment of the present invention, the sealing assembly comprises the rotor 50 and stator 10 with the unitizing element 30 housed therein. The rotor engaging member 33 of the unitizing element 30 engages the rotor groove 54 such that the axially outer sides of the rotor engaging member 33 contact the opposing walls of the rotor groove 54. In an embodiment of the present invention, the rotor engaging member 33 "floats" within the rotor groove 54 so as to minimize contact and friction during operation. When there is an axial shift of the rotor and stator relative to each other, the rotor engaging member 36 may then contact the corresponding wall of the rotor groove 54.

Similarly, the stator engaging member 31 contacts the stator groove and/or the groove wall 18a. During operation, the unitizing element "floats" within the cavity formed between the rotor and stator. However, the stator engaging member 31, being flexibly attached to the unitizing element 30, may provide a means to keep the unitizing element 30 in position by contacting the wall 18a of the stator groove 14 should the assembly shift during operation.

In an embodiment of the present invention, the unitizing element 30 also contains a rear member 32. The rear member 32 may prevent the rotor 50 and stator 10 from directly contacting one another in the event of axial movement toward each other. If the rotor 50 shifts toward the stator 10, the rear member 32 of the unitizing element 30 may contact the rear wall of the stator 19 before the rotor 50 and stator 10 make direct contact. The rotor 50 may contact and/or press against the unitizing element 30 via one of the opposing walls 58a of the rotor groove 54. This action may force the rear member 34 of the unitizing element 30 against the stator rear wall 19. In an embodiment where the unitizing element 30 is constructed of a lubricious plastic material, the frictional force between the unitizing element 30 and the rotor 50, and the unitizing element 30 and the stator 10 may be significantly less than direct contact between the rotor 50 and stator 10. The unitizing element 30 thereby may provide a wear-resistant buffer between the rotor 50 and stator 10 components. This may serve to prolong the useful life of the rotor and stator by minimizing wear of these two parts. When the unitizing element 30 reaches the end of its useful life, it may be replaced, with less operational downtime and replacement cost than that associated with replacing the rotor and stator.

In an embodiment of the present invention, the unitizing element 30 unitizes the rotor 50 and the stator 10 by filling a cavity 90 and contacting the opposing walls of the rotor groove 58a, 58b. The engaging member 31 rests within the groove 14 on the stator 10, but does not contact opposing walls 18a, 18b during normal operation. If an axial force is applied moving the rotor 50 away from the stator 10, opposing wall 58b may contact the rotor engaging member 33 in the area of the wall 34. This may force the unitizing element 30 to move with the rotor 50. Movement of the unitizing element 30 may be arrested by contact of the stator engaging member 31 with opposing wall 18a of the stator groove 14. By this action, the sealing assembly comprising the rotor 50, unitizing element 30, porous sealing element 40, and stator 10, may be unitized.

In an embodiment of the invention, in addition to the unitizing effect in the sealing assembly, the unitizing element 30 may also create a non-contacting relationship between the rotor 50 and stator 10. In the event of axial movement of the rotor 50 toward the stator 10, the rotor may contact the unitizing element 30 and force the rear member 32 into contact with the stator rear wall 19. The unitizing element 30 may be designed such that the rear member 32 extends toward the stator farther than the rotor annular flange 52. Thus, the rotor annular flange 52 is prevented from contacting the rear wall of the stator, thereby increasing the useful life of the rotor 50 and stator 10 by preventing undue wear of the components.

Although the present invention has been described with reference to particular embodiments, it should be recognized that these embodiments are merely illustrative of the principles of the present invention. Those of ordinary skill in the art will appreciate that the unitizing element and assembly of the present invention may be constructed and implemented with other materials and in other ways and embodiments. Accordingly, the description herein should not be read as limiting the present invention, as other embodiments also fall within the scope of the present invention.

That which is claimed is:

1. A seal comprising:
   a rotor configured to sealingly engage with a shaft;
   a stator engaged with the rotor to define a labyrinthine pathway and a first and second cavity, the stator configured to sealingly engage with a housing;
   at least one unitizing element disposed within the first cavity, the unitizing element comprising:
      a stator engaging member;
      a rotor engaging member;
      a rear member having a top edge, a side edge, and a bottom edge; and
      two adjoining areas of differing diameters, one area corresponding to the rotor engaging member and the other corresponding to the rear member; and
   at least one porous sealing element disposed within the second cavity.

2. The seal of claim 1, wherein the porous sealing element comprises a micro-cellular material.

3. The seal of claim 2, wherein the micro-cellular material comprises silicone foam.

4. The seal of claim 2, wherein the micro-cellular material comprises at least one of polyurethane, polysulfone, or polyethylene.

5. The seal of claim 2, wherein the micro-cellular material comprises a fibrous material.

6. The seal of claim 1, wherein the porous sealing element comprises pores with diameters of approximately 500 to 600 microns.

7. The seal of claim 1, wherein the porous sealing element comprises pores with diameters less than approximately 100 microns.

8. The seal of claim 1, wherein the porous sealing element comprises pores with diameters greater than or equal to approximately 100 microns 9. The seal of claim 1, further comprising a plurality of porous sealing elements.

10. The seal of claim 1, wherein the unitizing element comprises rubber, a fluorinated polymer, or resin.

11. The seal of claim 1, wherein the unitizing element comprises a lubricious plastic material.

12. The seal of claim 1, wherein the unitizing element comprises a filled polytetrafluoroethylene.

13. The seal of claim 1, further comprising a plurality of unitizing elements.

14. An apparatus comprising:
   a rotatable shaft;
   a housing;
   a rotor sealingly engaged with the rotatable shaft;

a stator sealingly engaged with the housing and engaged with the rotor to define a labyrinthine pathway and a first and second cavity;

at least one unitizing element disposed within the first cavity, the unitizing element comprising:
- a stator engaging member;
- a rotor engaging member;
- a rear member having a top edge, a side edge, and a bottom edge; and two adjoining areas of differing diameters, one area corresponding to the rotor engaging member and the other corresponding to the rear member; and at least one porous sealing element disposed within the second cavity.

* * * * *